United States Patent [19]

Suwijn

[11] Patent Number: 5,228,814
[45] Date of Patent: Jul. 20, 1993

[54] GEAR HOBBING MACHINE

[75] Inventor: Paul W. Suwijn, Pittsford, N.Y.

[73] Assignee: The Gleason Works, Rochester, N.Y.

[21] Appl. No.: 797,745

[22] Filed: Nov. 25, 1991

[51] Int. Cl.⁵ .................. B23F 9/08; B24B 49/00
[52] U.S. Cl. .................. 409/12; 51/105 HB; 409/74
[58] Field of Search .............. 409/11, 12, 14, 15, 409/2; 364/474.02, 474.28, 474.30, 474.06; 51/95 GH, 105 HB, 123 G

[56] References Cited

U.S. PATENT DOCUMENTS

| | | | |
|---|---|---|---|
| 1,905,310 | 4/1933 | Sinderson | 409/12 X |
| 2,481,974 | 9/1949 | Bradner | 409/14 |
| 2,537,967 | 1/1951 | Carlin | 409/14 |
| 2,690,701 | 10/1954 | Zimmermann et al. | 409/14 |
| 2,769,375 | 11/1956 | Moncrieff | 409/5 |
| 2,857,818 | 10/1958 | Zimmermann et al. | 409/15 |
| 2,906,178 | 9/1959 | Cotta | 409/14 |
| 3,143,040 | 8/1964 | Baumann | 409/21 |
| 3,301,134 | 1/1967 | Daniel | 409/14 |
| 3,874,267 | 4/1975 | Schwenke | 409/12 |
| 4,318,648 | 3/1982 | Deprez et al. | 409/11 |
| 4,631,869 | 12/1986 | Miyatake et al. | 409/15 X |
| 4,631,870 | 12/1986 | Sun | 364/474.06 X |
| 4,657,447 | 4/1987 | Faulstich et al. | 364/474.02 X |
| 4,759,113 | 7/1988 | Hunkeler | 409/11 X |
| 4,850,155 | 7/1989 | Sulzer | 51/287 |
| 5,074,080 | 12/1991 | Erhardt | 51/95 GH |

FOREIGN PATENT DOCUMENTS

| | | | |
|---|---|---|---|
| 414697 | 6/1925 | Fed. Rep. of Germany . | |
| 854000 | 10/1952 | Fed. Rep. of Germany . | |
| 2255514 | 5/1974 | Fed. Rep. of Germany . | |
| 3638141 | 5/1988 | Fed. Rep. of Germany | 405/2 |
| 261537 | 11/1988 | Fed. Rep. of Germany | 409/2 |
| 1022670 | 3/1953 | France . | |
| 162417 | 7/1987 | Japan | 409/2 |
| 156616 | 6/1988 | Japan | 409/11 |

OTHER PUBLICATIONS

Bausch, T., "Zahnradfertigung (Kontakt und Studium)", DE, Sindelfingen, Expert Verlag, 1986, pp. 125–129.

*Primary Examiner*—William Briggs
*Attorney, Agent, or Firm*—Robert L. McDowell; Ralph E. Harper

[57] ABSTRACT

Disclosed herein is a hobbing machine particularly for the production of spur and helical gears. The hobbing machine is characterized in that a separate mechanism for hob shifting is not required. The hob shifting, as well as other machine motions, is carried out by linear movement of the tool and workpiece relative to one another in up to three mutually perpendicular directions. The machine also includes tool support means to which the hobbing tool is mounted and which is rotatably adjustable for controlling the angular orientation of the hobbing tool. A control system including a computer controls the linear movements, angularly adjustable tool support movements, as well as the necessary timed rotations of the tool and workpiece.

25 Claims, 4 Drawing Sheets

GEAR HOBBING MACHINE

Field of the Invention

The present invention is directed to gear forming machines and in particular to those machines which form gears by the hobbing process, utilizing tools having helically arranged stock removing surfaces.

BACKGROUND OF THE INVENTION

In the hobbing process a rotating, generally cylindrical-shaped tool having helically arranged stock removing surfaces is brought into contact with a rotating workpiece, generally a gear blank. In spur gear hobbing, the tool and workpiece rotate in a timed relationship as though the workpiece were a gear rotating in mesh with a worm gear represented by the hobbing tool. When helical gears are hobbed, a supplemental rate of motion is applied to the workpiece rotation, either advancing or retarding the fundamental timing relative to hobbing tool rotational rate, in order to develop the appropriate helix angle across the face width of the gear teeth being machined. Hobbing is primarily used for producing spur and helical gears; however, other products, such as worm wheels, sprockets, and splined shafts may also be produced by the hobbing process.

In the process of hobbing spur and helical gear teeth, splines, and sprockets, a relatively short lengthwise region on the hob is employed in the generation of teeth on a given workpiece. While it would be possible to use very short hobs in general on hobbing machines (with the possible exception of those used for worm wheel hobbing), without ever shifting the tool lengthwise along its axis of rotation relative to the workpiece, in practice this is an uneconomical approach, because of the frequent tool exchange interval that would result. Such hobs are used only as a last resort under unusual conditions in which any relative shifting would result in mutilation of adjacent portions of the workpiece.

The general practice is to use a relatively long cylindrical hob, which is shifted along its axis either periodically in small increments during intervals between cutting operations, or continuously during the cutting operation in order to allow all regions along its length to cut and thus spread the tool wear over the entire tool. An adjustment in the workpiece rotational rate is made when continuously shifting to maintain timing with the tool. The purpose of axially shifting the tool, in either case, is simply to avoid excessive wear at any given location on the hob, thus maximizing the interval between tool exchanges and minimizing the amount of stock removed when the tool is resharpened.

Over the years there have been many approaches employed for shifting the hobbing tool along its axis relative to the work gear. One very common approach utilizes a linear slide (also known as a hob slide) which carries the hob and its support spindles, which are typically located at both ends of the tool. The hob slide motion is parallel to the longitudinal axis of the cylindrical tool. The drive means required to rotate the tool is connected to one of the two support spindles by means of a sliding splined or keyed shaft in many examples. Alternately, portions of the hob drive train, or even the entire hob drive train and its prime mover, may be incorporated into the hob slide. In the last case the tool may be shifted without the need for a sliding joint in the hob drive train.

In all of these examples, the hob slide is ordinarily mounted upon an angularly adjustable trunnion, hereafter called a hob head, which swivels about an axis perpendicular to and intersecting the hob's central axis. The hob head is rotated only as a machine setup function, then clamped in position to present the hob at an appropriate angle to the workpiece. Examples of typical hob head/hob slide configurations can be found in U.S. Pat. No. 2,906,178 to Cotta, U.S. Pat. No. 3,143,040 to Baumann, and U.S. Pat. No. 3,301,134 to Daniel.

U.S. Pat. No. 4,850,155 to Sulzer discloses hob grinding of helical gears using a threaded grinding tool, by a process of continuous hob shifting combined with linear motion parallel to the workpiece central axis (axial motion) to control feeding of the grinding tool. Such axial motion, often provided by a tool slide upon which the hob head and hob slide are mounted, is a normal feature of general-purpose gear hobbing machines, for the sake of developing the full face width of spur, helical or spline teeth.

In contrast to shifting the tool by means of a hob slide, another method has been accomplished, employing a sliding cylinder or spindle assembly which carries the hob. The assembly replaces a hob slide, but is likewise housed typically in an angularly adjustable hob head, with a sliding drive connection between the shifted assembly and the prime mover. U.S. Pat. No. 2,481,974 to Bradner discloses a telescoping arrangement of a sliding spindle inside a fixed sleeve for shifting the hobbing tool. U.S. Pat. No. 2,537,967 to Carlin discloses a sliding cylinder for hob shifting wherein the hobbing tool can be either continuously or incrementally advanced. U.S. Pat. No. 2,690,701 to Zimmermann et al. discloses manual shifting of a sliding spindle located between sections of a split hob head to effect hob shifting. Another sliding cylinder is shown in U.S. Pat. No. 2,769,375 to Moncrieff wherein the cylinder is utilized for hob shifting in a horizontal hobbing machine.

Another approach to positional movement of the hobbing tool is found in U.S. Pat. No. 2,857,818 to Zimmermann et al., wherein two rotatable trunnions and a translatable carriage located therebetween are utilized to shift and orient a hobbing tool. The method presented by Zimmermann et al. must employ continuous tool shifting over the entire tool length with each cut, and the practical tool length itself is determined by the face width of the gear to be generated. These limitations are not encountered with the more typical constructions previously described.

A hobbing machine utilizing an endless chain cutting tool is set forth in U.S. Pat. No. 4,318,648 to Deprez et al. The links of the chain each represent a tool with each successive link being offset from the preceding tool. The chain, arranged in this offset manner, has the same effect on a rotating gear blank as a cylindrical hob having helically arranged stock removing surfaces. In the instance of the endless chain, the workpiece is shifted periodically to equalize wear on the blades carried by the chain.

However, in the gear producing industry today, the most prevalent type of gear hobbing machines are those employing cylindrical tools, an angularly adjustable hob head, and an accompanying linear slide mechanism superimposed upon the hob head for shifting the hobbing tool along its own longitudinal axis.

In each of the above-described hobbing machines setting forth hob shifting, problems are encountered which are associated with the mechanism that must be included in order to position the hobbing tool. One problem encountered on machines of the prior art involves the space that must be reserved on the hob head to accomplish substantial shifting of the tool and its accompanying slide. While long tools are desirable to reduce the frequency of exchange, the size of the hob head needed to support substantial tool shifts, and to adequately clamp the translated mass, in practice limits the amount of tool shift that is workable, particularly on machines with compact floor space requirements. Prior art machines offering large shift ranges feature hob heads with pronounced, imbalanced radial extensions to provide adequate space for both the required drive train and the reserve space for shifting. Those machines which combine the drive means with the hob slide shift a corresponding greater mass in a radially-imbalanced fashion. The pronounced radial imbalance of such hob heads produces a large torsional moment which must be overcome during hob head rotation, and a center of mass which moves over a large range with respect to the hob head support structures. More importantly, such machines in the prior art often limit the extent of tool shifting to an undesirable degree in order to insure that the shifted mass can be clamped securely in the hob head.

On those prior art hobbing machines which orient the work axis vertically, hob heads are generally designed to rotate through an arc of about plus or minus (±) 45 degrees, measured from a horizontal tool position, in order to present the tool correctly for machining gears with teeth of various right or left-handed helix angles. On prior art hobbing machine which orient the work axis horizontally, hob head rotation is similarly limited, measured from a vertical tool position.

Hobs are ordinarily exchanged from the side of the hob head with the lesser radial extension, to limit the required reach. Because of the pronounced radial asymmetry of hob heads equipped with typical tool-shifting slides, it would be impractical to rotate the hob head through 180 or more degrees without producing an unacceptably wide machine envelope. Prior art hobbing machines with the entire drive means incorporated into the hob slide are still less suited to such extensive rotation, due to the interference which would result between the hob drive motor and gearbox elements, and the machine bed and work support structures. Lubrication and hydraulic hosing connecting the hob slide and the hob head, or serving the hob head from remote source points, would also tend to become entangled with other machine elements under conditions of extensive rotation, as would similarly arrayed motor cables.

It would nevertheless be desirable to provide such extensive rotation, in order to oppose the relatively slender hobbing tool outboard support to the relatively robust work support structure under all conditions, in order to reduce the extension of the work support fixture that is typically attached to the machine work spindle. By reducing the extension of the fixture, the work is brought closer to the work spindle support bearings, and the short fixture beam itself is deflected to a lesser extent under the application of heavy cutting forces, which factors contribute to a stiffer, more precise machine.

Because gears of both hands of helix must be machined, in roughly half of the cutting conditions the drive side of the hob head, which is lobed to house the drive gearing and which suffers the greater radial extension, must be rotated downward toward the work support structure and machine bed, on prior art machines with typically limited hob head rotational capacity. Great radial extension thus invites interference, particularly as the helix angle of the workpiece increases. This condition is ordinarily compensated for by lengthening the work fixture to an undesirable degree. Structurally detrimental cutouts in the machine bed or work support structure may even be necessary to provide an acceptable rotational range.

On prior art gear hobbing machines with the work axis oriented vertically, it is also necessary to elevate the hob head more substantially above the machine bed to the extent that the work fixturing is elongated, resulting in proportionately greater moments which must be resisted by the hob head support structure. These moments are in themselves detrimental to machining precision. Certain hobbing machines in the prior art have attempted to reduce work fixture height by combining an exaggerated hob overhang with a tall, slender work spindle housing. Such attempts have not been optimally successful because of the loss of stiffness inherent in such structural tradeoffs, combined with the inability in these constructions to provide extensive hob rotational capacity as described above.

A further difficulty encountered with hobbing machines of the prior art is the increase in tool overhang which results from the thickness of the hob slide itself, resulting in increased detrimental moments upon the hob head support structure. The hob slide itself, and the provisions to clamp it successfully over its range of motion, also substantially increase the overhung mass of the hob head.

An additional problem with prior art hobbing machines is the exposure of hob slideways to processing fluids, chips, and swarf, which can lead to their deterioration, as these slideways are located in a position which is very difficult to protect effectively, in close proximity to the point of machining. The drive means and train that produce hob shifting must also be located on the hob head and therefore within the cutting chamber, thus exposing the associated motor and cables to the same adverse conditions.

It is an object of the present invention to provide a gear hobbing machine of greatly simplified structure wherein the stated drawbacks of the prior art hobbing machines are substantially eliminated.

It is a further object of the present invention to provide a gear hobbing machine capable of shifting the hobbing tool without a hob shifting slide or cylinder.

SUMMARY OF THE INVENTION

The present invention is directed to a hobbing machine for producing gears, particularly spur and helical gears. The inventive machine comprises a machine bed having a work head, comprising workpiece support means, and a hob column, comprising hob support means, located on the machine bed. The work head moves upon bedways positioned across the machine bed. The work head contains the work spindle and the work drive means for rotating the workpiece about its own longitudinal axis, which is oriented vertically in the preferred embodiment.

The hob column is also movable along said machine bed, upon bedways which provide a motion which is substantially perpendicular to the motion of the work head.

An nonrotatable axial slide is mounted upon the hob column, providing a vertical component to tool motion in a direction which is substantially parallel to the workpiece longitudinal axis, and substantially perpendicular to the movements of both the work head and the hob column.

A hob head is mounted upon the axial slide, and is rotatable about an axis which is substantially parallel to the motion of the hob column. The hob head includes means for releasably mounting a hobbing tool for rotation about the longitudinal axis of the tool. The hobbing tool is normally mounted such that its axis is substantially perpendicular to the axis of hob head rotation. The hob head and axial slide are characterized by the absence of a self-contained hob shifting means, such as a superimposed linear slide, or sliding cylinder arrangement.

The present invention further includes means for moving the hob column, work head, and axial slide, whereby the hobbing tool and the workpiece are capable of substantially simultaneous motion with respect to each other in no more than three mutually perpendicular directions. The present inventive machine further includes means to rotate both the hobbing tool and the workpiece in a timed relationship, and to rotationally adjust the hob head in order to position the hobbing tool angularly. A control means such as computerized systems, for example, computer numerical control (CNC), or equivalent electronic calculating means are connected to appropriate controllable drive means, such as electrically powered motors, to provide the necessary linear and rotational movements referred to above.

With the machine of the present invention, the difficulties and inaccuracies referred to above are eliminated, resulting in a more precise, structurally sound, and stiff machine, yet one that is mechanically simpler than the hobbing machines of the prior art.

DETAILED DESCRIPTION OF THE PREFERRED EMBODIMENT

The present invention will now be discussed with reference to the accompanying Drawings.

Figure 1:
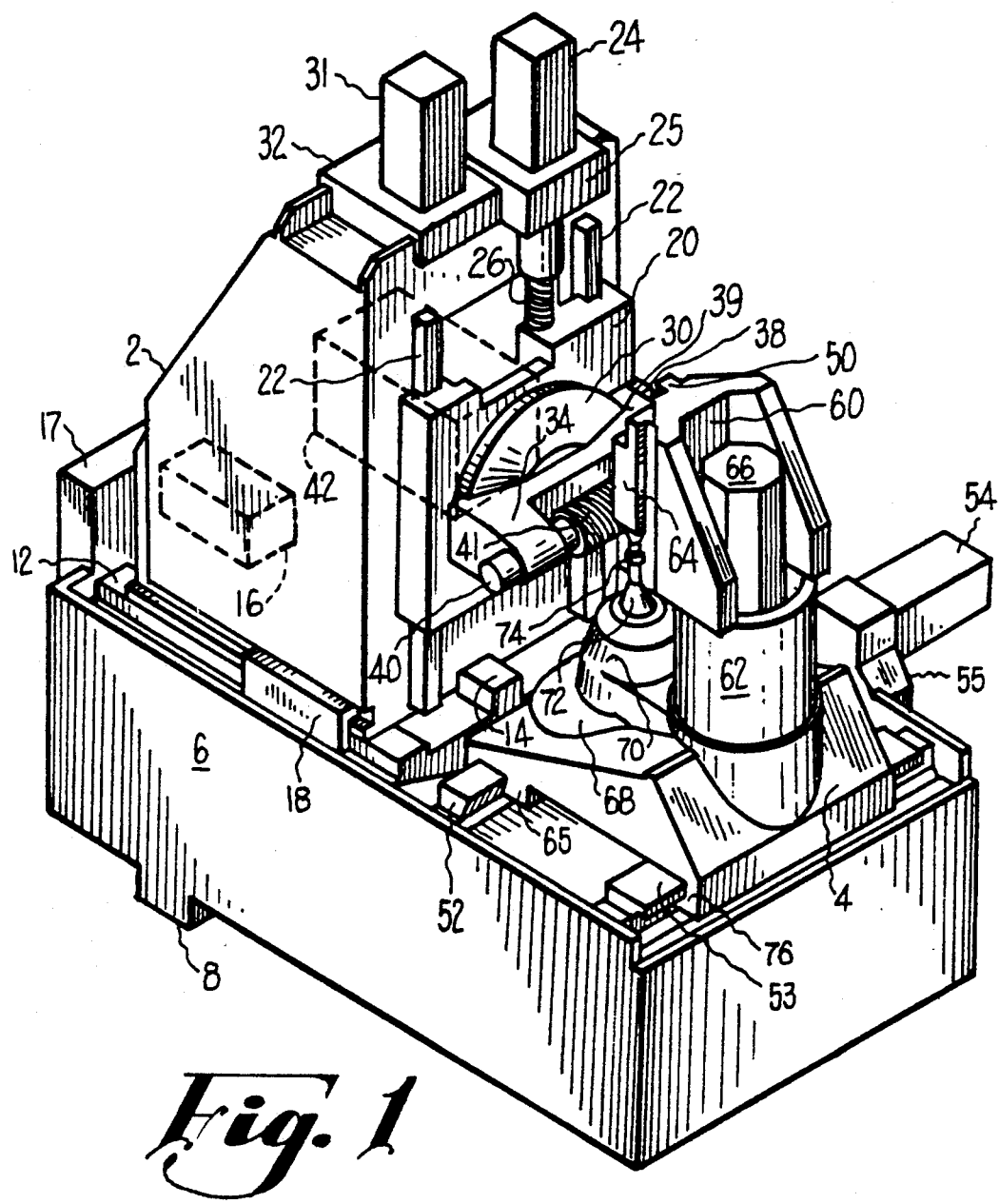
FIG. 1 schematically illustrates the preferred embodiment of the present invention.

The preferred embodiment of the present invention is shown in FIG. 1. The inventive hobbing machine comprises a hob column 2 and a work head 4 located on a generally rectangular machine bed 6. Located on the underside of the machine bed 6 is a plurality of machine supports, one of which is shown at 8.

Figure 2:
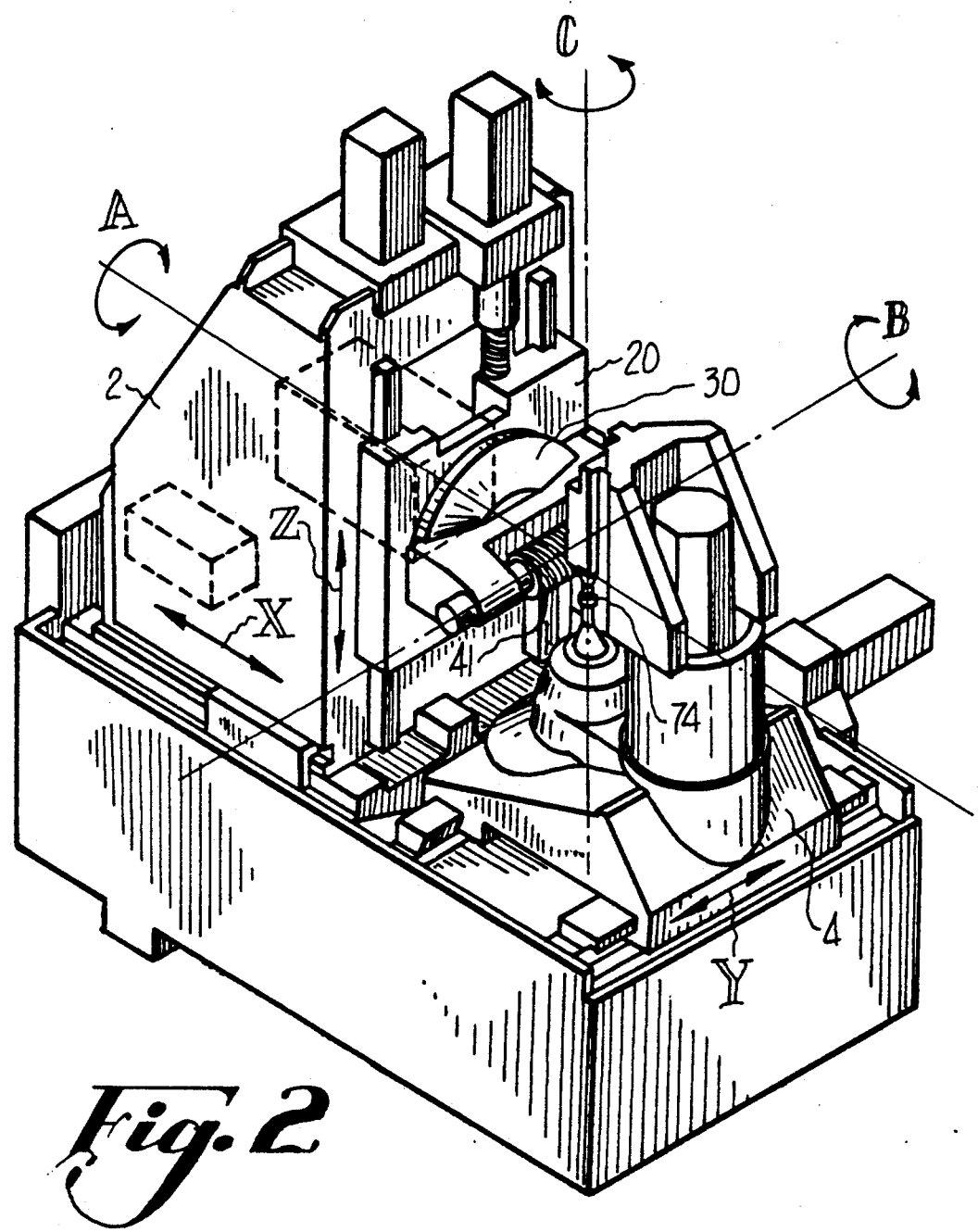
FIG. 2 illustrates the linear and rotational axes of the present invention.
Figure 4:
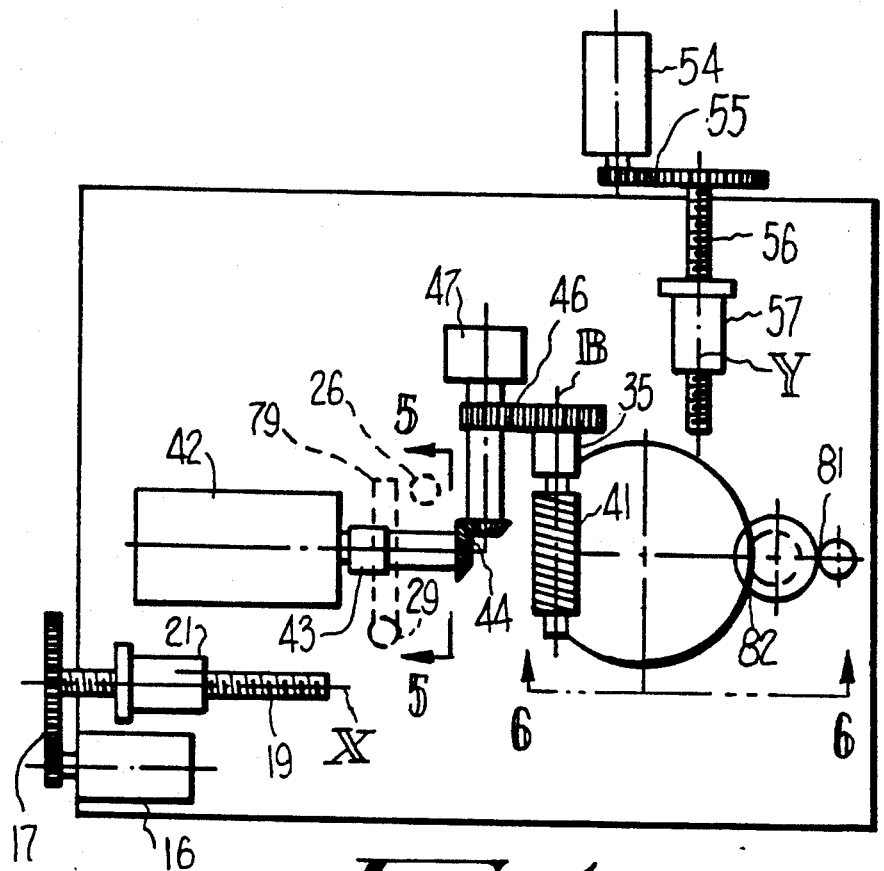
FIGS. 4, 5 and 6 schematically illustrate the drive trains for the linear and rotational axes motions of the present invention.

- Hob column 2 is mounted upon bedways 12 (only one of which is shown) for linear movement along the length of machine base 6. This motion, which is radial with respect to the workpiece 74, is labelled the X-axis of machine motion. FIG. 2 illustrates the axes of linear and rotational motions of the present invention. Guidance key 14 provides linear control for the aforesaid radial motion of the hob column 2 along machine bed 6. Servomotor 16 is coupled to hob column 2 via gearbox 17, ball screw 19 and ball nut 21 (See FIG. 4) for moving hob column 2 along the bedways 12 and guidance key 14. Preloaded gibs 18 (one of which is shown) may be provided to further secure hob column 2 to bedways 12, along both sides of the hob column.

Axial slide 20, guided by ways 22 which are in turn located upon hob column 2, provides vertical motion which is perpendicular to the direction of movement of hob column 2. This motion, which is parallel to the longitudinal axis of the workpiece 74, is labelled the Z-axis of machine motion. Movement of axial slide 20 is effected by servomotor 24, acting through gearbox 25, ball screw 26 and ball nut 27 connected to axial slide 20. See FIG. 5 for illustration of the axial slide drive train.

The means for mounting the hobbing tool comprises hob head 30, mounted to the face of axial slide 20. The hob head 30 is an angularly adjustable trunnion which incorporates tool outboard support housing 34 as well as gearbox 39, which represents the final portion of the hob drive train which transmits motive power to hobbing tool 41. Hob head 30 is rotatable about its own axis (A-axis) and is driven by servomotor 31 via gearbox 32. A sliding spline arrangement 23 and spline shaft 28 connects the gearbox 32 with a final worm gear 29 housed within concealed portions of axial slide 20. See FIG. 5. The wormwheel 79 in this final set is attached to a hub which projects from the back of the hob head 30 to effect the necessary rotary motion.

Hobbing tool 41 is centrally located on hob head 30 in the preferred embodiment, but the present invention also includes mounting the tool 41 in essentially any location on the face of hob head 30, rather than locating the tool's working surfaces necessarily at the point of intersection with the hob head rotational axis, which is a constraint in the prior art.

In the preferred embodiment the hob head 30 rotation axis (A-axis) is parallel to the direction of movement of hob column 2 (X-axis). Tool outboard support housing 34 and hob drive gearbox 39 rotate with hob head 30 since they are incorporated in, or secured to, the same housing.

Figure 3:
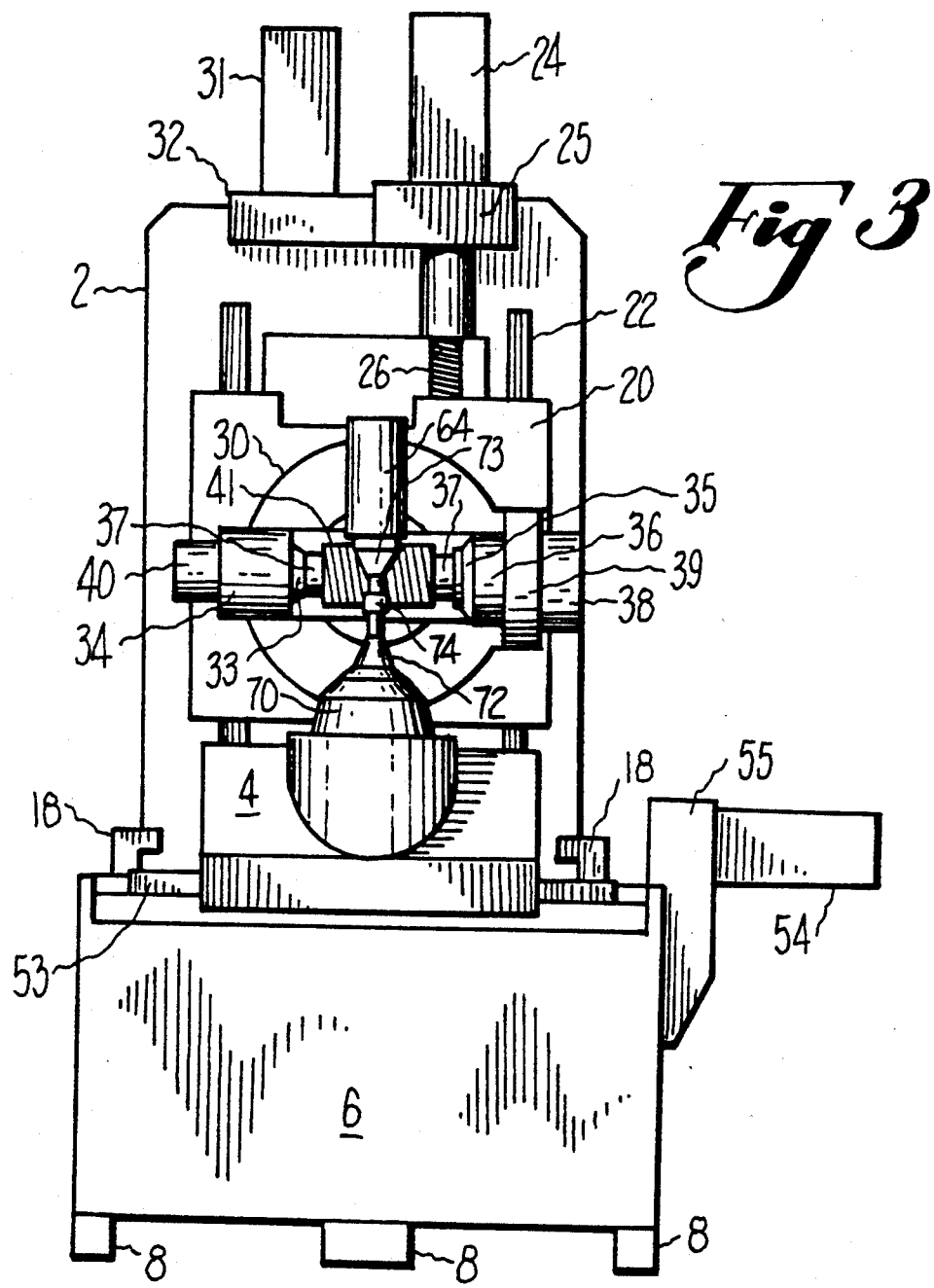
FIG. 3 is an end view of the preferred embodiment, illustrating the machine bed, work head, hob column, axial slide and, hob head.

In FIG. 3, it may be seen that hobbing tool 41, for example a generally cylindrically-shaped cutting or grinding tool having at least one helically arranged stock removing surface, is rotatably secured between a driven spindle 33 within outboard support housing 34 and a drive spindle 35 within spindle housing 36, via tool mounting fixture elements 37. Alternately, the hobbing tool 41 may provide suitable integral projections which eliminate the need for a tool mounting fixtures 37. In either case, the tool mounting fixture or the hobbing tool itself typically provides a projecting feature on the drive side which may be grasped by an clamping mechanism, such as a chuck, located in housing 38. The outboard support spindle 33 engages portions of the tool mounting fixture 37 or the tool 41 by means of piston located within housing 40, for example, which also permits that spindle to be retracted to provide clearance for hobbing tool exchange. It will be apparent to the skilled artisan that the particular type of tool fixture 37 that is used, will be dependent upon the type of hobbing tool that is utilized.

Referring again to FIG. 1, hobbing tool 41 is driven for rotation about its axis (B-axis), by motor 42, which is attached to the opposite side of axial slide 20, and thus rises and falls with the motion of the axial slide 20, within hob column 2. Included in the hobbing tool drive train (FIG. 4) is a motor coupling 43 and a primary reduction bevel gear set 44 located within hob head 30 directly behind hobbing tool 41. The input member of the bevel set is aligned with the rotational axis of hob head 30 (A-axis). Also included are an optional flywheel 47 located in housing 38 along with the tool fixture chucking means referred to above, and a final reduction spur or helical gear set 46 located in gearbox 39.

The absence of a hob shifting slide or cylinder allows the hobbing tool 41 to be located closer to the face of axial slide 20 than is possible in the prior art, reducing the moment arm between the active machining surfaces of the tool and the face of the axial slide. This directly reduces the overturning effects of the machining moment upon hob head 30, as well as reducing both torsional and overturning effects upon axial slide 20 and hob column 2. Since the active machining surfaces of the hobbing tool 41 need not intersect the axis of hob head rotation, tools may be biased in their position toward the outboard support in order to avoid interferences with other machine structures and facilitate easy exchange by the operator.

Work head 4, which contains the drive means for rotating workpiece 74, incorporates a linear slide function, and is movable across the width of machine bed 6 on bedways 52 and 53. The surfaces of work head 4 which contact way 52 include portions which project downwardly therefrom to contact both sides of way 52, with the effect that way 52 also serves as a guidance key to keep work head 4 properly aligned on machine bed 6. Preloading and clamping means 65 are included in these projections for securing the work head 4 in any given position, when incremental shifting methods are employed. Clamps are not used when continuous shifting methods are practiced, though the aforementioned preloading means are retained. Work head 4 is additionally secured to machine base 6 by means of preloading elements 76 which are affixed to work head 4 and apply force to the underside of way 53.

Movement of the work head 4, as well as any superimposed structures such as tailstock column 60, 62 is effected by servomotor 54 acting through gearbox 55, ball screw 56 and ball nut 57 connected to work head 4. See FIG. 4. The direction of movement of the work head 4 (Y-axis motion) is perpendicular to the movements of both hob column 2 (X-axis) and axial slide 20 (Z-axis). Thus it is seen that the workpiece and tool are movable relative to one another in up to three mutually perpendicular directions.

Although the axes arrangement described above is preferred, it is also within the scope of the present invention to arrange the relative mutually perpendicular movements of the tool and workpiece in any other combination. For example, hob column 2 may move across the width (Y-axis) of machine bed 6, and work head 4 may move lengthwise (X-axis) with respect to machine bed 6. Alternately, work head 4 could be fixed to machine bed 6, with a slide providing Y-axis motion interposed between machine bed 6 and hob column 2. It would also be plausible to introduce axial (Z-axis) motion on the work head side, with X-axis and Y-axis motion provided on the hob column side of the machine in a number of possible configurations. The present invention also contemplates providing a trunnion for A-axis rotation on the work side of the machine, rather than the tool side, such as that provided by hob head 30 in the preferred embodiment. The teachings of the present invention are also equally applicable to those hobbing machines having the workpiece oriented perpendicular to that shown in the preferred embodiment, these machines being known as "horizontal" hobbing machines. In this last instance the Y-axis of motion becomes the axial element, the Z-axis becomes the tangential element, and the X-axis remains the radial element with respect to the workpiece.

Figures 5, 6:
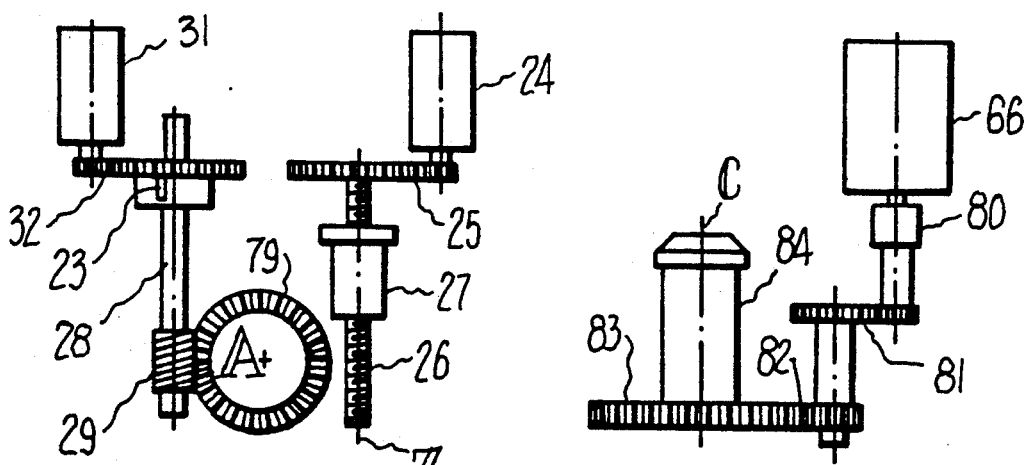

Secured to work head 4 is a tailstock column comprising an upper tailstock column section 60 and a lower tailstock column section 62. Attached to the upper section 60 is tailstock assembly 64, which may be raised and lowered on a guiderail 50 or alternately contain a retractable quill assembly. Workpiece drive motor 66 is attached directly to elements of work head 4, and is contained within tailstock column sections 60 and 62 when the column is provided. As shown in FIG. 6, the work drive motor 66 is connected via a coupling 80, first gear reduction 81, and a second gear reduction 82, to a final gear 83 located within housing portion 68, which final gear 83 rotates a spindle 84 located within housing portion 70 to rotate workpiece 74 about its own axis, termed the C-axis of rotation.

A workpiece loading/unloading mechanism (not shown) may be located in the vicinity of or attached to lower tailstock column section 62. The loading/unloading mechanism may be of the rotary loader type which operates through 180 degree oscillations, or alternately of the unidirectional type which advances new workpieces in fixed angular increments while simultaneously removing gears already produced. Workpiece load/unload mechanisms of other configurations may instead be provided without disturbing the fundamental structure of the present invention.

FIG. 3 illustrates an end view of the preferred embodiment of the present invention with the first tailstock column section 62, the second tailstock column section 60, and the workpiece drive motor 66 removed to provide an enhanced view of the tool 41 and the workpiece 74.

The workpiece 74 is held in position by at least one workpiece fixture comprising fixture 72, and, in the preferred embodiment, by a tailstock fixture 73. Alternatively, in some instances, only workpiece fixture 72 is required to adequately hold a workpiece in position. In this case, there is no need for tailstock column sections 60, 62, guiderail 50, tailstock 64 and tailstock fixture 73 to be present. After loading the workpiece, the tailstock fixture 73 is moved into position by movement of the tailstock assembly 64 by a means such as a piston (not shown). Once the tailstock fixture 73 is positioned, the workpiece fixture 72 is activated to clamp the workpiece 74 by means such as an hydraulic chuck located in housing portion 70 for expanding a collet within the bore of the workpiece 74, to name one method among several possible clamping strategies.

Relative movements of the hobbing tool and the workpiece along the specified mutually perpendicular axes X, Y, and Z are controlled by the separate motors 16, 54, and 24 respectively associated therewith which act through speed reducing gearing (or belting, alternately) and ball screw drives. These motions include movement of hob column 2 along the length of machine bed 6, movement of work head 4 across the width of machine bed 6, and movement of axial slide 20 vertically with respect to machine bed 6. Rotation is imparted to hobbing tool 41 about the B-axis and to workpiece 74 about the C-axis by respective motors 42 and 66. Angular motion is imparted to hob head 30 about the A-axis by motor 31.

Each of the respective drive motors is associated with either a linear or rotary encoder (not shown) and a computer (not shown) as part of a computer numerically controlled (CNC) system which governs the operation of the drive motors in accordance with instructions input to a computer. The encoders provide feedback information to the computer concerning the actual positions of each of the movable, linear and rotational machine axes. CNC systems for controlling movement of multiple machine axes along prescribed paths and about prescribed axes are now commonplace. Such state-of-the-art systems are incorporated in the present invention to control movements of selected axes for forming workpieces, such as spur and helical gears, of desired geometry.

Looking at FIG. 3, it can be seen that radially projecting elements are nearly symmetrical on hob head 30. This is the result of eliminating the conventional hob shifting mechanism in the present invention. Due to the ability of the inventive machine to move the tool and workpiece relative to one another in up to three mutually perpendicular directions, there is no need to include a separate hob shifting mechanism. The hobbing tool is shifted by interpolation of the tool and workpiece along one or more of the X-, Y-, and Z-axes. This nearly symmetrical arrangement has the added advantage that it affords operator access to the machining chamber from either side of the hobbing machine, and therefore provides the option of placing operator controls on either side of the machine.

The elimination of the separate hob shifting mechanism also results in greater stability of the hob support structures of the present invention. Since the extensive gearbox projections normally required to reserve space for shifted hob slides or cylinders are eliminated, the large torsional stresses acting on the axial ways 22 and hob column 2 due to the imbalanced mass of these projections are greatly reduced.

The plurality of hoses supplying hydraulic and lubrication fluids, which heretofore were typically connected from points in space to the hob head, and which in turn linked the hob head and hob slide, have been entirely eliminated, since in the present invention it is possible to route all fluids through the hub on the reverse side of hob head 30, since all hob drive elements beyond the motor 42 are contained within a single housing. Electrical cables which in the prior art serve the hob shifting motor, encoder, and reference switches, as well as those which in some prior art examples serve a frontally-mounted hob drive motor, are similarly eliminated from the hob head, with their functions transferred to machine regions outside the machining chamber. In these remote locations, such hoses, cables, and motors suffer little or no exposure to the ill effects of processing fluids and chips. The highly exposed slideways typically provided for hob slide translation across the hob head in the prior art are essentially transferred to a location beneath work head 4 in the present invention, where they can be effectively sheltered by telescoping guarding from gradual ill effects. It will also be appreciated that the present invention removes all drive motors from the machining chamber, as well as any gearbox except those portions required to rotate the hobbing tool and workpiece.

The combined elimination of prior art features such as hoses, cables, motors, a hob slide and associated gearbox, and of strong radial projections of hob head elements, make extensive rotation of hob head 30, on the order of about 270 degrees or more, quite practical in the present invention. The limited radial extension of hob head 30, together with its ability to be rotated in such a manner that relatively slender outboard support housing 34 may always be opposed to relatively robust work head spindle housing 70, provides important benefits, which are described below.

In order to take advantage of extensive hob head rotation, the hob may be rotated in either direction, a feature not normally provided in the prior art. In the event that the workpiece requires a right-hand helix angle, the hobbing tool 41 is mounted initially with the leading edges of its machining surfaces rotating in what is conventionally termed a "top coming" orientation. That is, the top of the hobbing tool 41 as seen in FIG. 3 would rotate toward the work, transmitting the machining force downward toward work head 4, which is the universally preferred rotational direction for obtaining high machining accuracy. In the case of machining workpieces of right-hand helix angle, hob head 30 would be initially rotated in a manner that elevates the lobe of hob head gearbox 39 upward, toward the relatively slender tailstock 64, which direction has the lesser interference potential.

In the case of machining workpieces of left-hand helix angle, in the prior art the equivalent of hob head gearbox 39 must be rotated downward toward the similarly robust work spindle housing 70 and machine bed 6, introducing strong prospects of interference as the hob head setting angle increases. These interferences are remedied in the prior art by increasing the height of work fixture 72 substantially, and often by limiting the total hob shift value as well.

In the present invention, workpieces of left-hand helix angle may be hobbed more advantageously by initially mounting the hobbing tool 41 in hob head 30 in a "bottom-coming" orientation, then rotating the hob head typically about 135 or more degrees from the position shown in FIG. 3, with the result that the hob is repositioned in the preferred "top-coming" orientation with the slender hob head outboard support 34 again opposed to the more robust work spindle housing 70, and hob head gearbox 39 again elevated above hob head horizontal centerline and thus opposed to the relatively slender tailstock 64. In the case of hob grinding, the tool can always be mounted the same way, as the machining edges of the tool have no specific directionality.

The present invention thus eliminates the need to create cutouts in either machine bed 6 or work head 4 in order to provide clearance for gearbox 39, or for the more pronounced radial projections typical of prior art hob heads, while conserving space formerly reserved for the same strong radial hob head projections through their range of X, Z, and A-axis motions.

Because of the limited interference potential of hob head 30 when employed in the manner just described, work fixture 72 can be made very short relative to similar fixturing in the prior art, resulting in improved machine stiffness and accuracy not only on the work side, but also because hob head 30 can operate closer to X-axis ways 12, thus further reducing the effects of overturning and torsional moments produced by machining forces on hob column 2. It should also be noted that, in the prior art, hob slide gibs and portions of the hob slide itself may interfere with work spindle housing 70 or the base of work fixture 72, limiting the practical minimum height of the work fixture and thus the minimum practical hob head operational height in another respect. Such gibs and hob slide elements are eliminated entirely in the present invention, further reducing interference potential at desirable low operating heights.

Still another advantage of the present invention is that rotation of hob head 30 can now take place with very little change in the center of mass of the hob support structure as a whole, in spite of its extensive rotational capability. The abbreviated radial extension of the current invention brings the center of mass much closer to the axis of hob head rotation than is the case in the prior art, and the added, translated mass of the hob slide itself is eliminated along with its drive means. A relatively stable and central hob head mass contributes to more consistently accurate fine radial motions, such as those required for the lengthwise crowning of gear teeth, for example, while reducing potentially detrimental torsional effects on axial slide rails 22.

In the operation of the hobbing machine in the present invention, process parameters such as tooth number, pitch diameter, number of hobbing tool threads, gear face width, hob head rotational angle and certain axis rates are input into the machine computer as is conventional in the computer controlled machines of the prior art. Hob column 2 is retracted along bedways 12 to allow a workpiece 74 to be loaded either manually or automatically and clamped into position by workpiece holding fixtures 72 and 73. Hob head 30 will already have been rotated to and clamped at the proper angular setting based upon the lead angle of the hobbing tool 41 and the desired helix angle of workpiece 74. The hobbing tool 41 and the workpiece 74 are then rotated in a timed relationship, while the hob column 2 is moved inwardly along ways 12 until the rotating hobbing tool 41 reaches an effective position to commence machining. Then, any combination of X-, Y-, and Z-axis motions are employed to effect the required gear tooth machining. Once machining is complete, hob column 2 retracts again, and the Y- and/or Z-axes are rapidly reset to the new starting position, which resetting motions may in the present invention include periodic incremental changes to reposition the tool relative to the workpiece, for the purpose of distributing wear evenly along the length of the tool.

As in the prior art, shifting the hobbing tool 41 along its axis of rotation (B-axis) relative to workpiece 74 can take place during the hobbing process in a continuous manner, or incrementally between machining operations. In either case, tool shifting is accomplished in the present invention by moving work head 4 and axial slide 20 in a substantially simultaneous manner to effect relative movement of the tool along its axis of rotation with respect to the workpiece. This two axis (Y and Z) movement is necessary when the angular setting of the hobbing tool 41 is at any position except one that is parallel to the direction of work head motion Y, that is, when the hobbing tool is horizontal. In this limited instance there would be no Z-axis component required for shifting the workpiece relative to hobbing tool 41, the Y-axis movement of work head 4 being sufficient in itself to accomplish this function.

Alternate embodiments of the present invention include a hob column construction in which the hob column itself is fixed to the machine bed, toward one side of the machine. The axial slide (Z-axis) is then mounted on the side of the column toward the machine longitudinal centerline, and a radial slide (X-axis) is superimposed upon the axial slide. The radial slide in this instance would support the hob head in the position described in the preferred embodiment, while the work head would still provide Y-axis motion as previously described. This rearrangement of X- and Y-axis slides in no way detracts from the teachings of the present invention, as the same three mutually perpendicular linear axes would serve their intended purposes in the manner already set forth, likewise eliminating the need for a hob slide or sliding cylinder arrangement on the hob head.

Another alternative embodiment includes a direct drive spindle motor replacing the hob drive spindle, for the purpose of motivating the hobbing or hob grinding tool, thus eliminating the entire hob drive train. The limitation of this embodiment would be the substantial radial projection of the hob drive motor from the hob head, which would likely prevent extensive hob head rotation. Such radial projection could be somewhat reduced, however, by biasing the tool substantially toward the outboard support side of the hob head, and further still by minimizing or eliminating the outboard support altogether, as would be plausible under certain hob grinding conditions due to the lesser amplitude of machining forces. In any case, the tool shifting means would be performed in keeping with the present invention, with the tool shifting slide typical of the prior hob grinding art eliminated. Under these conditions, it would be possible to further reduce tool overhang on the hob head, or alternately to provide a tool of greater diameter, owing to the elimination of the bevel gear set contained in the hob head of the preferred embodiment. The portion of the hob head directly behind the tool could thus be scalloped significantly under these conditions to provide the necessary tool clearance.

The present invention represents an advance over machines of the prior art by providing a mechanically stiffer machine exhibiting improved dynamic characteristics, and yet one which is less costly to produce given that the need for a separate tool shifting slide or cylinder is eliminated. The inventive machine can be made more reliable that the hobbing machines of the prior art. The absence of the separate tool bearing slide or cylinder mechanism will result in greater reliability because the tool bearing slide or cylinder that is typically shifted is often heavily exposed to swarf or chip laden process fluids. Since this mechanism is not present in the inventive hobbing machine, the problems associated therewith are also eliminated and reliability is enhanced.

While the present invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A machine for producing gears, said machine comprising:
    workpiece support means comprising means for releasably securing a workpiece for rotation about an axis of rotation of said workpiece,
    a rotatable hob head mounted on a linearly movable, nonrotatable axial slide, said hob head having an axis of rotation and being rotatable about said axis of rotation, said rotatable hob head comprising means for releasably securing a hobbing tool for rotation about an axis of rotation of said hobbing tool, said hob head being characterized by the absence of a separate hob shifting means thereon, said machine further comprising (a) means whereby said hobbing tool and said workpiece support are movable relative to one another in a direction along an X-axis, (b) means whereby said hobbing tool and said workpiece support are movable relative to one another in a direction along a Y-axis, and (c) means whereby said hobbing tool and said workpiece support are movable relative to one another in a direction along a Z-axis, said X, Y, and Z axes being mutually perpendicular and said hobbing tool and workpiece support being substantially simultaneously movable along said X, Y, and Z axes, the relative movement of said hobbing tool and said workpiece support being controlled by a control means, said hobbing tool being shifted relatively along said axis of rotation of said hobbing tool by the relative movement of at least one of said workpiece support and said hobbing tool, said hobbing tool shifting being controlled by said control means.

2. The machine of claim 1 wherein said control means includes an electronic calculating means.

3. The machine of claim 2 wherein said electronic calculating means comprises a computer.

4. The machine of claim 1 wherein said hobbing tool is shifted relatively along said axis of rotation of said hobbing tool by linear movement of at least one of said workpiece support means and said hob head, the shifting being controlled by said control means.

5. A hobbing machine for forming gears, said machine comprising:

a machine bed, a work head located on said machine bed, said work head being movable in a direction along said base, said work head including a means for mounting a workpiece for rotation about an axis of rotation of said workpiece, a hob column located on said machine bed, said hob column being movable along said base in a direction substantially perpendicular to the direction of movement of said work head, said hob column including a nonrotatable axial slide located thereon, said axial slide being movable in a direction substantially perpendicular to the directions of movement of said hob column and said work head, a hob head mounted on said axial slide and including means for rotating said hob head about an axis extending substantially parallel to the direction of movement of said hob column, and hob head comprising a means for releasably mounting a hobbing tool for rotation about an axis of rotation of said hobbing tool, and wherein said hob head is characterized by the absence of a separate hob shifting means thereon, means for controlling the movement of said hob column in a direction along an axis X, means for controlling the movement of said work head in a direction along an axis Y, and means for controlling the movement of said axial slide in a direction along an axis Z, said X, Y, and Z axes being mutually perpendicular, said hobbing tool and said workpiece being substantially simultaneously movable with respect to each other along said X, Y, and Z axes, said means for controlling further controlling the rotations of said hobbing tool and said workpiece in a timed relationship and providing rotational adjustment of said hob head whereby said hobbing tool is angularly positionable, said hobbing tool being shifted along said axis of rotation of said hobbing tool by movement of at least one of said axial slide along said Z axis and said work head along said Y axis, the shifting being controlled by said means for controlling.

6. The machine of claim 5 wherein said hobbing tool is a cutting tool.

7. The machine of claim 5 wherein said hob head is of a generally circular shape with the hob mounting means being located substantially at the center of said hob head.

8. The machine of claim 5 wherein said hob head is of a generally circular shape with the hob mounting means being located at a position other than at the center of said hob head.

9. The machine of claim 5 wherein said hob head further includes the hob mounting means being mounted within a recessed region of said hob head.

10. The machine of claim 5 wherein said hob head further includes a drive spindle located within a housing and a driven spindle located within an outboard support.

11. The machine of claim 10 further including tool clamping means and spindle retracting means.

12. The machine of claim 10 further including tool mounting fixtures.

13. The machine of claim 5 wherein said hobbing tool is driven by a motor located within said hob column.

14. The machine of claim 5 wherein said machine bed comprises a length and a width, said hob column being movable along said length of said machine bed.

15. The machine of claim 14 wherein said length is of a greater dimension than said width.

16. The machine of claim 5 wherein said hobbing tool is a grinding tool.

17. The machine of claim 5 wherein said means for controlling includes computer numerical control.

18. The machine of claim 5 wherein said hob head is rotatable through an angle of about 270 degrees.

19. The machine of claim 5 wherein said work head includes a tailstock column.

20. The machine of claim 5 wherein said work head further comprises at least one workpiece fixture.

21. In a machine for producing gears by the hobbing process, said machine comprising:

a hob mounting means for releasably mounting a hobbing tool for rotation about an axis of rotation of said hobbing tool, a workpiece support means for releasably mounting a workpiece for rotation about an axis of rotation of said workpiece, means for controlling the relative rotation of said hobbing tool and said workpiece in a timed relationship, means for moving said hob mounting means and said workpiece support means relative to one another, the improvement comprising:

said hob mounting means being mounted on a linearly movable, nonrotatable axial slide, said hob mounting means being rotatable whereby the angular position of said hobbing tool can be controlled, said hob mounting means and said axial slide being characterized by the absence of a separate hob shifting means thereon, said workpiece support being linearly movable in a direction perpendicular to the direction of movement of said axial slide, wherein shifting of said hobbing tool along said axis of rotation of said hobbing tool is carried out by linear movement of at least one of said axial slide and said workpiece support.

22. A method of shifting a tool on a hobbing machine relatively along the axis of rotation of said tool, said method comprising:

(a) providing a hobbing machine having:
a machine bed,
a work head located on said machine bed, said work head being movable along an axis Y in a direction along said base, said work head including a means for mounting a workpiece for rotation about an axis of rotation of said workpiece,
a hob column located on said machine bed, said hob column being movable along an axis X along said base in a direction substantially perpendicular to the direction of movement of said work head, said hob column including a nonrotatable axial slide located thereon, said axial slide being movable along an axis Z in a direction substantially perpendicular to the directions of movement of said hob column and said work head,
a hob head mounted on said axial slide and rotatable about an axis extending substantially parallel to the direction of movement of said hob column, said hob head comprising a means for releasably mounting a hobbing tool for rotation about an axis of rotation of said hobbing tool, and wherein said hob head is characterized by the absence of a separate hob shifting means thereon,
means for controlling the movement of said hob column along said X axis, means for controlling the movement of said work head along said Y axis, and means for controlling the movement of said axial slide along said Z axis whereby said hobbing tool and said workpiece are substantially simultaneously movable with respect to each other along said X, Y, and Z axes, said means for controlling further controlling the rotations of said hobbing tool and said workpiece in a timed relationship and providing rotational adjustment of said hob head whereby said hobbing tool is angularly positionable, (b) moving at least one of said work head and said axial slide along their respective axes to relatively shift said tool along its axis of rotation.

23. The method of claim 22, wherein said work head and said axial slide are moved substantially simultaneously.

24. The method of claim 22 wherein said shifting takes place between machining operations.

25. The method of claim 22 wherein said shifting takes place during machining of a workpiece.

* * * * *